3,538,146
DINITRO-ISOBORNYLPHENYL ESTERS
Sheldon N. Lewis, Willow Grove, and Colin Swithenbank, Perkasie, Pa., assignors to Rohm and Haas Company, Philadelphia, Pa., a corporation of Delaware
No Drawing. Filed May 13, 1968, Ser. No. 728,789
Int. Cl. C07c 69/62, 69/54, 69/14
U.S. Cl. 260—479         6 Claims

ABSTRACT OF THE DISCLOSURE

Novel compounds belonging to the class of 2,4-dinitro-6-isobornylphenyl esters. These compounds possess biological activity and are particularly noteworthy as miticides.

---

This invention is concerned with novel esters derived from 2,4-dinitro-6-isobornylphenol which conform to the structure

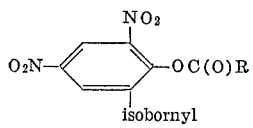

wherein R is a methyl, chloromethyl, ethyl, vinyl (—CH=CH$_2$) or isopropenyl (—C(CH$_3$)=CH$_2$) group.

The isobornyl group or radical may be depicted as

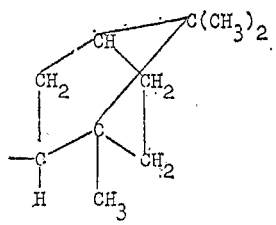

but for simplicity in this invention the term isobornyl will be used.

Dinitrobornylphenol and its salts are known in the literature, for example, see U.S. Pats. 2,289,550, 2,311,282 and 2,385,719. This invention is specifically concerned with certain esters of 2,4-dinitro-6-isobornylphenol. The specific esters of this invention are outstanding miticides and also possess insecticidal and fungicidal properties.

These esters may be prepared by reacting 2,4-dinitro-6-isobornylphenol or phenate with an acid halide or acid anhydride according to the following equation:

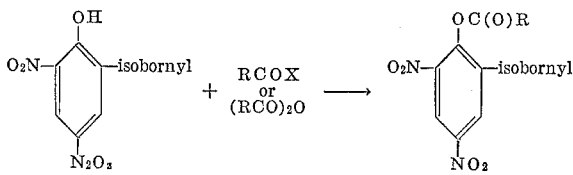

wherein R is as defined above and X is a halide, preferably chloride.

When an acid halide is used the reaction is run in the presence of an acid acceptor to neutralize the HX which is generated. Suitable acid acceptors are tertiary amines such as pyridine, triethylamine and benzyldimethylamine; and alkali and alkaline earth hydroxides and carbonates such as potassium hydroxide, sodium hydroxide, sodium carbonate, and calcium carbonate. Although not required, an inert solvent for the reaction may be used. Suitable solvents may be found in the hydrocarbon, halogenated hydrocarbon, ketone or ether classes of solvents. Aromatic hydrocarbon solvents such as benzene or toluene are preferred. The reaction may be run in the range of 0° C. to 80° C. with ambient temperatures being preferred.

When an acid anhydride is reacted with the phenol, the reaction may be catalyzed by the presence of a strong acid such as sulfuric acid.

The esters of this invention may also be prepared by reaction of dinitroisobornylphenol with an RCOOH acid in the presence of an appropriate catalyst, by transesterification procedures, and by reaction of a 2,4-dinitro-6-isobornylhalobenzene, preferably where halo is a fluoro or chloro group, with RCOOH acid salts such as sodium acetate and potassium chloroacetate.

Details of preparing the compounds of this invention are given in the following examples which are presented for purposes of illustration and are not intended to limit the scope of the invention.

EXAMPLE 1

Preparation of 2,4-dinitro-6-isobornylphenyl acetate (a) 2-isobornylphenol.—A solution of aluminum phenoxide in phenol was prepared by the cautious addition of 25 g. of aluminum in 2 g. lots over one hour to 2400 ml. of phenol (about 27 moles) at 170–175° C., with stirring. The temperature of the solution was reduced to 130° C. and 2000 ml. of molten camphene (about 12 moles) were added and the solution was stirred at this temperature for five hours. The reaction mixture was cooled to 40°–50° C., then was treated with 1000 ml. of 10% hydrochloric acid to decompose the aluminum phenoxide. The layers were separated and the organic phase further washed three times with 1000 ml. of 10% hydrochloric acid. Excess phenol was removed by distillation through a fractionating column, and the residue was recrystallized from hexane to give 1850 g. of 2-isobornylphenol, M.P. 95–100° C. The method of preparation is in accordance with known procedures which give ortho-substitution (see U.S. Pat. 2,831,898) and the 2-isobornylphenol configuration was confirmed by the infrared spectrum.

(b) Benzyldimethylamine salt of 2,4-dinitro-6-isobornylphenol.—A solution of 300 ml. of nitric acid in 400 ml. of acetic acid was added dropwise, with stirring, to a solution of 250 g. (1.1 mole) of 2-isobornylphenol in 250 ml. of acetic acid. The temperature was maintained at 5°–10° C. during the addition, then was allowed to rise to room temperature, at which point stirring was continued for three hours. Water (1500 ml.) was added slowly to precipitate the dinitrophenol, and the aqueous solution was decanted off and discarded. The precipitate was washed twice with 1000 ml. of water by decantation, then was dissolved in 1000 ml. of hexane at 50° C. The solution was washed twice with 500 ml. of warm water, then dried briefly with magnesium sulfate and the solvent removed to give 306 g. of crude 2-isobornyl-4,6-dinitrophenol. This was dissolved in 700 ml. of anhydrous ether and a solution of 130 g. of benzyldimethylamine in 100 ml. of anhydrous ether was added slowly with stirring and cooling. Filtration yielded 326 g. of the amine salt, melting at 177°–180° C. This was found to contain by analysis 65.77% C, 7.56% H, 9.26% N and 17.51% O; calculated for $C_{25}H_{33}N_3O_5$ is 65.9% C, 7.3% H, 9.2% N and 17.5% O. The product is a 65% yield of the benzyldimethylamine salt of 2,4-dinitro-6-isobornylphenol.

(c) 2,4-dinitro-6-isobornylphenyl acetate.—To a suspension of 100 g. (0.22 mole) of the benzyldimethylamine salt of 2,4-dinitro-6-isobornylphenol in 300 ml. of toluene was added dropwise at 30° C. 19.3 g. (0.246 mole) of acetyl chloride. The mixture was stirred with heating on a steam bath for about 4 hours then cooled. The reaction mixture was washed five times with 200 ml. portions of water and the solvent removed from the toluene layer to give 75 g. of a brown solid, melting at 94°–95° C. This was found by analysis to contain 59.78% C, 6.34% H and 7.76% N; calculated for $C_{18}H_{22}N_2O_6$ is 59.66% C, 6.15% H, 7.7% N. The product is a 73% yield of 2,4-dinitro-6-isobornylphenyl acetate.

EXAMPLE 2

Preparation of 2,4-dinitro-6-isobornylphenyl propionate

To a suspension of 25 g. (0.055 mole) of the benzyldimethylamine salt of 2,4-dinitro-6-isobornylphenol in 200 ml. of benzene was added dropwise in 25 minutes at room temperature a solution of 5.1 g. (0.055 mole) of propionyl chloride in 50 ml. of benzene. The reaction mixture was stirred overnight at room temperature and then filtered to remove benzyldimethylamine hydrochloride. The residue was washed with benzene and the washings added to the benzene filtrate which was then washed three times with 250 ml. of water. The benzene layer was dried over magnesium sulfate and the solvent removed to leave a black tarry residue. This residue was extracted three times with 200 ml. portions of hot pentane. The combined pentane extracts were reduced to one-half volume and cooled to give 7 g. of yellow solid melting at 76°–78° C. The solid was found to contain by analysis 60.64% C, 6.58% H, 7.34% N and 25.45% O; calculated for $C_{19}H_{24}N_2O_6$ is 60.63% C, 6.43% H, 7.44% N and 25.5% O. The product is 2,4-dinitro-6-isobornylphenyl propionate.

EXAMPLE 3

Preparation of 2,4-dinitro-6-isobornylphenyl chloroacetate

When the procedure of Example 2 was followed using 45.5 g. (0.1 mole) of the benzyldimethylamine salt of 2,4-dinitro-6-isobornylphenol and 11.3 g. (0.1 mole) of chloroacetyl chloride in place of propionyl chloride, there was isolated 16.5 g. of benzyldimethylamine hydrochloride and 42.6 g. of residual oil. Pentane extracts of the oil yielded 12 g. of light yellow solid melting at 86°–88° C. This contained by analysis 54.37% C, 5.32% H, 9.04% Cl, 7.0% N and 24.2% O; calculated for $C_{18}H_{21}ClN_2O_6$ 54.5% C, 5.33% H, 8.94% Cl, 7.05% N and 24.2% O. The product is 2,4-dinitro-6-isobornylphenyl chloroacetate.

EXAMPLE 4

Preparation of 2,4-dinitro-6-isobornylphenyl acrylate

When the procedure of Example 2 was followed using 5 g. (0.055 mole) of acrylyl chloride in place of propionyl chloride, a black tarry residue was obtained. Extraction of this residue with pentane gave 4.3 g. of pale tan crystals melting at 95°–100° C. This solid was found to contain 60.60% C, 5.84% H, 7.54% N and 24.91% O; calculated for $C_{19}H_{22}N_2O_6$ is 60.95% C, 5.92% H, 7.48% N and 25.64% O. The product is 2,4-dinitro-6-isobornylphenyl acrylate.

EXAMPLE 5

Preparation of 2,4-dinitro-6-isobornylphenyl methacrylate

When in the procedure of Example 2 there was used 14 g. (0.031 mole) of the benzyldimethylamine salt of 2,4-dinitro-6-isobornylphenol and 3.3 g. (0.031 mole) of methacrylyl chloride in place of propionyl chloride, there was obtained a black tarry residue. This residue upon extraction with pentane gave 4.5 g. of tan solid melting at 79°–81° C. This solid was found by analysis to contain 62.02% C, 6.47% H, 7.02% N and 24.65% O; calculated for $C_{20}H_{24}N_2O_6$ is 61.85% C, 6.23% H, 7.21% N and 24.71% O. The product is 2,4-dinitro-6-isobornylphenyl methacrylate and infrared data confirmed this structure.

These esters of 2,4-dinitro-6-isobornylphenol have been found to be excellent biocides and are particularly useful as fungicides, insecticides and miticides. Numerous esters of 6-hydrocarbylsubstituted-2,4-dinitrophenols are known to possess biocidal properties of these types. Such compounds which have achieved commercial success include 2,4-dinitro-6-sec-butylphenyl-3,3-dimethylacrylate (binapacryl) and 2,4-dinitro-6-(1-methylheptyl)phenyl crotonate (dinocap). The esters of the present invention are outstanding in that they combine within one structure high initial mite kill, high mite ovicidal activity and low phytotoxicity. Also, the 2,4-dinitro-6-isobornylphenol precursor of these esters has favorable pharmacological properties such as a low propensity for production of cataracts.

For use as pesticides, the esters of this invention may be used as solutions or as formulated compositions. Typical formulations are emulsifiable concentrates, wettable powders, granules or dusts. Such compositions comprise the esters of this invention as the active ingredients together with an agronomically acceptable carrier and, if desired, one or more surface active agent such as emulsifying agents, wetting agents, sticking agents or dispersing agents. Other agents such as anticorrosive agents, stabilizing agents, anti-foaming agents or penetrants may also be used, if desired.

An emulsifiable concentrate is made by dissolving one or more of the 2,4-dinitro-6-isobornylphenyl esters in a solvent to which one or more surfactants are added. Suitable solvents or liquid carriers for use in preparing these emulsifiable concentrates may, for example, be found in the hydrocarbon and ketone classes of organic solvents such as xylene, acetone or cyclohexane and mixtures of these. Preferred solvents are the aromatic hydrocarbons. The emulsifying agents used are surfactants of the anionic, cationic, or nonionic types and mixtures thereof. Representative of the anionic surfactants are fatty alcohol sodium sulfates, calcium alkylbenzenesulfonates and sodium dialkyl sulfosuccinates. Representatives of the cationics are (higher alkyl) dimethylbenzylammonium chlorides. Representative of the nonionics are condensation products of alkylene oxides with fatty alcohols, alkyl phenols, mercaptans, amines or fatty acids, such as dinonylphenoxypolyethoxyethanol in which there are 8 to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are used:

|  | Parts/100 parts total |
|---|---|
| 2,4-dinitro-6-isobornylphenyl ester | 10–35 |
| Solvent | 55–88 |
| Emulsifying agent | 2–10 |

Wettable powder formulations comprise one or more of the 2,4-dinitro-6-isobornylphenyl esters admixed in a solid carrier along with one or more surface active agent which give this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flour or tobacco dust; and suitable inorganic ones are clays of the montmorillonite (bentonite), kaolinite or fuller's earth types; silicas such as diatomaceous earth and hydrated silicates; and calcium and magnesium carbonates. A surfactant or mixture of surfactants is added to the wettable powder formulation. Suitable dispersing agents are sodium lignin sulfonate, sodium formaldehyde-naphthalene sulfonate, or sodium N-methyl-N-higher alkyl taurates. Wetting agents useful for this include higher alkylaryl sulfonates such as calcium dodecylbenzenesulfonate, long-chain alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are 8 to 80 ether groupings and similar polyethoxy compounds made from stearyl alcohol. Operative spreading or adhesive agents include glycerol mannitan laurate or a condensate or polyglycerol and oleic acid modified with phthalic anhydride. Additionally, many of the surfactants discussed above function as spreading and adhesive agents. The active ingredient content of the wettable powders may be in the range of about 20 to 80%; however, the preferred range of concentration is 50 to 75%.

The following compositions are typical for wettable powder formulations:

| | Parts/100 parts total |
|---|---|
| 2,4-dinitro-6-isobornylphenyl ester | 20–80 |
| Carrier | 10–79 |
| Surfactants | 1–10 |

Dust concentrates are made by incorporating a 2,4-dinitro-6-isobornylphenyl ester of this invention into a solid carrier such as finely powdered clays, talc, silica and synthetic silicates, alkaline earth carbonates and diluents of natural origin, such as tobacco dust or walnut shell flour. Granular formulations are made from similar type solid carriers except that the particle size is large, in the range of 15 to 60 mesh. A small amount of dispersing agent may be incorporated into these solid formulations.

The compounds of this invention were evaluated as miticides by standard greenhouse procedures. In this test 10-day old potted bean (*Phaseolus vulgaris*) plants were infested with two-spotted mites (*Tetranychus urticae*). Twenty-four hours later the plants were sprayed to run-off with a dosage series of the test compound. The first dosage was made to contain 80 p.p.m. in an acetone: water (20:80) solution and subsequent dosages were made to contain 40, 20 and 10 p.p.m. by appropriate dilutions with water. The plants were allowed to dry and placed in environmental chambers at 100° F. for 24 hours. The live and dead adult mites were counted on three separate leaves of each plant and the data plotted to give an $LD_{50}$ value. For ovicide tests excised leaves having mite eggs thereon from the original sprayed pots of bean plants were placed on floral pics and held 6 days at 80° F. Unhatched eggs and live mites were then counted and an $LD_{50}$ value determined. Table I gives the results.

TABLE I.—MITICIDAL ACTIVITY

| | Kill of adult mites $LD_{50}$ (p.p.m.) | Ovicide, $LD_{50}$ (p.p.m.) |
|---|---|---|
| Compound of Example: | | |
| 1 | 10 | 30 |
| 2 | 14 | 22 |
| 3 | 20 | 40 |
| 4 | 18 | 30 |
| 5 | 19 | 30 |
| 2,4-dinitro-6-isobornylphenol | 10 | >150 |

The compounds of this invention were evaluated as insecticides for control of the Southern corn root worm larvae (*Diabrotica undecim punctata howardi*). In this test a filter paper was placed in the bottom of a Petri dish and sprayed with an aqueous emulsion of the test compound at varying per cent concentrations. There was then placed in the center of the treated filter paper an aqueous suspension containing approximately 50 eggs of the adult insect. Five days later counts were made of the emerged larvae which had died on both treated and untreated papers. There was no ovicidal action. Tests were also run using Mexican bean beetle larvae (*Epilachna varivestis*) as the test insect. In this test a detached leaf of a lima bean plant was placed in a Petri dish lined with filter paper and sprayed with an aqueous emulsion of the test compound at varying concentrations. The leaf was then infested with 10 third instar larvae of the insect and held for 48 hours. The per cent kill on treated and untreated leaves was then determined.

Table II gives the results of these tests.

TABLE II.—INSECTICIDAL ACTIVITY

| Compound of Example | Concentration, Percent | Percent kill of— | |
|---|---|---|---|
| | | So. corn root worm larvae | Mexican bean beetle |
| 1 | 0.2 | 75 | |
| | 0.05 | 61 | |
| 2 | 0.2 | 100 | |
| | 0.05 | 74 | |
| 3 | 1.0 | 100 | 100 |
| | .1 | | 90 |
| | .05 | 45 | |
| 4 | 0.2 | 100 | 90 |
| | .05 | 37 | |
| 5 | 0.2 | 100 | 100 |
| | .05 | 0 | |

In other tests a 1% aqueous spray of 2,4-dinitro-6-isobornylphenyl acetate was found to give a 60% kill of the Southern armyworm (*Prodenia eridania*) and an 80% kill of the boll weevil (*Anthonomus grandis*).

A fungicidal test was run by a standard greenhouse technique using powdery mildew on beans (*Erysiphe polygoni*) as the test organism. In this test potted dwarf horticultural bean plants were sprayed to run off with an aqueous spray containing the test compound at a concentration of 150 p.p.m. The plants were allowed to dry 24 hours and were then inoculated with a spore suspension containing about 20,000 spores per ml. of the powdery mildew organism. The plants were then held in the greenhouse for 7–10 days after which the disease control was estimated by comparison with untreated control plants. In this test the compounds of Examples 1, 2, 3, 4 and 5 all gave 95–100% control of the disease.

In phytotoxicity tests on grape seedlings the dinitroisobornylphenyl esters of this invention were considerably less injurious to the grape leaves than 2,4-dinitro-6-isobornylphenol.

The novel compounds of this invention may be used in conjunction with fertilizer and with other pesticides, such as herbicides and in particular with other fungicides, insecticides and miticides.

Fungicides which may be combined with these dinitroisobornylphenyl esters include dithiocarbamates and derivatives such as ferric dimethyldithiocarbamate (ferban), zinc dimethyldithiocarbamate (ziram, manganese ethylenebisdithiocarbamate (maneb) and its coordination product with zinc ion, zinc ethylenebisdithiocarbamate (zineb), tetramethylthiuram disulfide (thiram) and 3,5-dimethyl - 1,3,5,2H-tetrahydrothiadiazine-2-thione; nitrophenol derivatives such as dinitro-(1-methylheptyl)phenyl crotonate (dinocap), 2-sec-butyl-4,6-dinitrophenyl 3,3-dimethylacrylate (binapacryl) and 2-sec-butyl-4,6-dinitrophenyl isopropyl carbonate: heterocyclic structures such as N-trichloromethylthio-tetrahydro-phthalimide (captan), N-trichloromethylthio-phthalimide (folpet), 2-heptadecyl-2-imidazoline (glyodin), 2,4-dichloro-6-(o-chloroanilino)-s-triazine, diethyl phthalimidophosphorothioate, 5 - amino - 1-[bis(dimethylamino)phosphinyl]-3-phenyl-1,2,4-triazole, 2,3-dicyano-1,4-dithia-anthraquinone (dithianon), 2-thio-1,3-dithio[4-5-b]quinoxaline (thioquinox), 1-(butylcarbamoyl)-2-benzimidazole carbamic acid methyl ester, 4-(2-chlorophenylhydrazono)-3-methyl-5-isoxazolone and bis(p-chlorophenyl)-3-pyridinemethanol; and miscellaneous fungicides such as dodecylquanidine acetate (dodine), 3-[2-(3,5-dimethyl-2-oxycyclohexyl)-2-hydroxyethyl]glutarimide(cycloheximide), phenylmercuric acetate, N-ethylmercuri-1,2,3,6-tetrahydro-3,6-endomethano-3,4,5,6,7,7-hexachlorophthalimide, phenylmercuric monethanolammonium lactate, 2,3-dichloro-1,4-naphthoquinone, pyridine-2-thiol-1-oxide, Bordeaux mixture and sulfur.

Insecticides which may be incorporated with the novel esters of this invention include chlorinated insecticides such as 1,1,1 - trichloro - 2,2-bis(p-chlorophenyl)ethane (DDT), 1,1,1 - trichloro-2,2-bis(p-methoxyphenyl)ethane (methoxychlor), 2,2 - bis(p-chlorophenyl)-1,1-dichloroethane (TDE), 1,1-dichloro-2,2-bis(p-ethylphenyl)ethane, 1,2,3,4,10,10-hexachloro-6,7-epoxy-1,4,4a,5,6,7,8,8a-octahydro - 1,4-endo-endo-5,8-dimethanonaphthalene (endrin), decachloro-1,3,4-methano-2H-cyclobuta[6d]pentalen-2-one and the gamma isomer of 1,2,3,4,5,6-hexachlorocyclohexane (lindane); carbamates such as 1-naphthyl N-methylcarbamate (carbaryl) and 4-(methylthio)-3,5-xylyl methylcarbamate; organic phosphorus insecticides such as S-[1,2-bis(ethoxycarbonyl)ethyl] O,O-dimethyl phosphorodithioate (malathion), O,O-diethyl O(and S)-2-(ethylthio)-ethyl phosphorothioates (demeton), O,O-diethyl - O-p-nitrophenyl phosphorothioate (parathion), O,O-diethyl O-(2-isopropyl-4-methyl-6-pyrimidyl thionophosphate (diazinon), O,O-dimethyl S-(N-methylcarbamoylmethyl)phosphorodithioate (dimethoate), 1,2-dibromo-2,2-dichloroethyl dimethyl phosphate (naled), O,O-diethyl S-p-chlorophenylthiomethyl phosphorodithioate (carbophenothion) and O,O - dimethyl S-[4-oxo-1,2,3-benzotriazin-3(4H)yl-methyl] phosphorodithioate; and miscellaneous insecticides such as 6-methyl-2,3-quinoxalinedithiol cyclic carbonate, nicotine, rotenone, lead arsenate and *Bacillus thuringiensis*.

Miticides which may be incorporated with the novel esters of this invention include dinitrocyclohexylphenol and its salts, 2-sec-butyl-4,6-dinitrophenyl isopropyl carbonate, 1,1 - bis(p-chlorophenyl)-2,2,2-trichloroethanol (dicofol), 1,1-bis(p-chlorophenyl)ethanol, ethyl 4,4'-dichlorobenzilate (chlorobenzilate), bis(p-chlorophenoxy) methane, p-chlorobenzyl p-fluorophenyl sulfide, N-(2-methyl - 4-chlorophenyl)-N,N'-dimethylformamidine, p-chlorophenyl p-chlorobenzenesulfonate (ovex), 2,4-dichlorophenyl benzenesulfonate and 2,3-p-dioxane S,S-bis (O,O-diethylphosphorodithioate).

We claim:
1. Esters of 2,4-dinitro-6-isobornylphenol of the formula

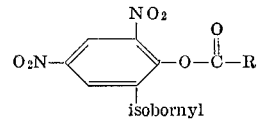

wherein R is a member of the group selected from methyl, chloromethyl, ethyl, vinyl, and isopropenyl.

2. The compound of claim 1 which is 2,4-dinitro-6-isobornylphenyl acetate.

3. The compound of claim 1 which is 2,4-dinitro-6-isobornylphenyl propionate.

4. The compound of claim 1 which is 2,4-dinitro-6-isobornylphenyl chloroacetate.

5. The compound of claim 1 which is 2,4-dinitro-6-isobornylphenyl acrylate.

6. The compound of claim 1 which is 2,4-dinitro-6-isobornylphenyl methacrylate.

References Cited
UNITED STATES PATENTS 3,123,522    3/1964    Scherer et al. _____ 167—30

JAMES A. PATTEN, Primary Examiner

U.S. Cl. X.R.

260—619; 424—311, 314, 999